(No Model.)

G. H. WELLS, Jr.
ANIMAL TRAP.

No. 469,429.  Patented Feb. 23, 1892.

Witnesses
B. S. Ober
H. F. Riley

Inventor
George H. Wells, Jr
By his Attorneys,
C. A. Snow & Co.

UNITED STATES PATENT OFFICE.

GEORGE H. WELLS, JR., OF LAKE CHARLES, LOUISIANA, ASSIGNOR OF ONE-HALF TO SOLOMON BLOCH, OF SAME PLACE.

ANIMAL-TRAP.

SPECIFICATION forming part of Letters Patent No. 469,429, dated February 23, 1892.

Application filed November 14, 1891. Serial No. 411,902. (No model.)

*To all whom it may concern:*

Be it known that I, GEORGE H. WELLS, Jr., a citizen of the United States, residing at Lake Charles, in the parish of Calcasieu and State of Louisiana, have invented a new and useful Trap, of which the following is a specification.

The invention relates to improvements in animal-traps.

The object of the present invention is to simplify and improve the construction of animal-traps and to increase their efficiency.

The invention consists in the construction and novel combination and arrangement of parts hereinafter fully described, illustrated in the accompanying drawings, and pointed out in the claims hereto appended.

Figure 1:
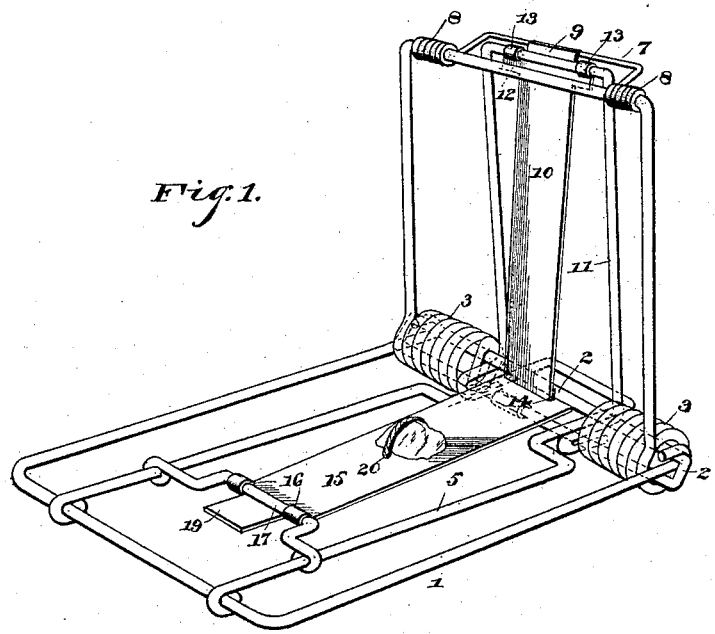
Figure 2:
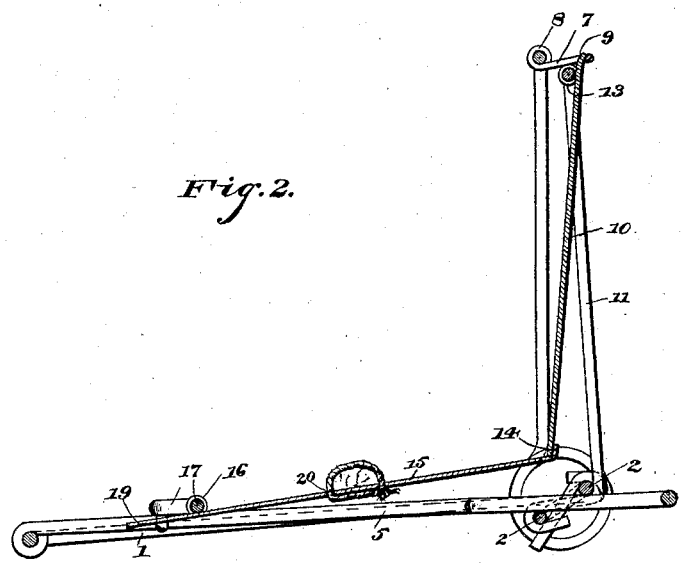

In the drawings, Figure 1 is a perspective view of a trap constructed in accordance with this invention. Fig. 2 is a central longitudinal sectional view.

Like numerals of reference indicate corresponding parts in both the figures of the drawings.

1 designates a main frame or base connected at the rear by a transverse brace 2, around which pass the coils 3 of the striking-wire, and the said frame or base 1 is supported and strengthened by a longitudinal brace 5. The striking-wire has attached to its transverse portion 6 a wire loop 7, which is approximately rectangular and is provided at its ends with coils 8, arranged on the transverse portion 6, and is adapted to engage a lip 9 of a trigger-plate 10. The trigger-plate 10 is hinged to a trigger-frame 11, and is provided at its upper end with lateral extensions 12, which are bent upon themselves to provide eyes 13, whereby the trigger-plate is hinged to the trigger-frame. The lower end of the trigger-plate engages, when the trap is set, a flange 14 of a bait plate or pan 15, which has its front end hinged by eyes 16 to a transverse rod 17, having its ends secured to the sides of the longitudinal brace and provided intermediate its ends with bends 18, arranged on opposite sides of the bait-pan to prevent the same moving laterally on the rod 17. The flange 14 is arranged at the rear end of the bait plate or pan 15, and the front end of the latter is provided with a forwardly-extending thumb-piece 19, adapted to be depressed to raise the rear end of the bait plate or pan to carry the flange 14 into engagement with the lower end of the trigger-plate.

The bait plate or pan is provided at its center with perforations 20, through which may be passed a cord or wire for securing a suitable bait to the bait plate or pan. An animal in attempting to get the bait will depress the pan or plate and spring the trap.

It will be seen that the trap is simple and inexpensive in construction and efficient in operation.

What I claim is—

1. In a trap, the combination of a frame, a striking-wire mounted on the frame and provided with coils and having a transverse portion, a loop secured to the transverse portion of the striking-wire and provided at its ends with coils disposed on the striking-wire, a trigger-frame, a trigger-plate mounted on the trigger-frame and provided with a lip to engage the said loop, and a bait-plate hinged to the frame and adapted to be engaged by the trigger-plate, substantially as described.

2. In a trap, the combination of a frame, a striking-wire mounted on the frame and provided with coils and having a transverse portion, a loop secured to the transverse portion 6, a trigger-frame, a trigger-plate mounted on the trigger-frame and provided at its upper end with a lip and having lateral extensions bent upon themselves to form eyes to receive the trigger-frame, and a bait-plate adapted to engage the trigger-plate, substantially as described.

3. In a trap, the combination of a frame, a striking-wire, a trigger-frame, a trigger-plate hinged to the trigger-frame, a transverse rod connected with the frame and provided intermediate its ends with bends, and a bait-plate provided at its rear end with a flange to be engaged by the trigger-plate and having at its front end eyes arranged between the bends of the transverse rod and provided with a forwardly-projecting thumb-piece, substantially as and for the purpose described.

In testimony that I claim the foregoing as my own I have hereto affixed my signature in the presence of two witnesses.

GEORGE H. WELLS, JR.

Witnesses:
R. H. ODOM,
D. H. HARMAN.